US005110555A

United States Patent [19]

Moore et al.

[11] Patent Number: 5,110,555

[45] Date of Patent: May 5, 1992

[54] CAPILLARY FLOW APPARATUS FOR INOCULATION OF A TEST SUBSTRATE

[75] Inventors: Craig E. Moore, Elkhart; Kerry Wilson, South Bend, both of Ind.

[73] Assignee: Miles Inc., Elkhart, Ind.

[21] Appl. No.: 408,915

[22] Filed: Sep. 18, 1989

[51] Int. Cl.[5] .......... B65B 3/04; G01N 1/18

[52] U.S. Cl. .......... 422/100; 422/102; 422/104; 422/56; 422/58; 436/165; 436/169; 436/180; 436/809; 73/863.32; 73/864.81; 141/31; 141/244; 141/246; 141/369; 222/460; 222/478; 222/566

[58] Field of Search .......... 422/56, 58, 61, 100, 422/102, 104; 73/863.32, 864.81; 436/165, 169, 180, 808, 809; 141/31, 35, 244, 246, 325, 369; 222/460, 478, 566

[56] References Cited

U.S. PATENT DOCUMENTS 3,650,306 3/1972 Lancaster .......... 422/100 X
4,498,510 2/1985 Minshew, Jr. et al. .......... 73/864.18 X
4,593,728 6/1986 Whitehead et al. .......... 73/864.01 X
4,654,309 3/1987 Mlinar et al. .......... 422/56 X
4,925,629 5/1990 Schramm .......... 422/100 X
4,931,400 6/1990 Jitsukawa .......... 422/100 X
4,952,516 8/1990 Matkovich .......... 422/102 X

*Primary Examiner*—Lynn Kummert
*Attorney, Agent, or Firm*—Roger N. Coe

[57] ABSTRACT

An inoculation device preferably for use in the testing of a fluid sample such as urine. The device includes a capillary flow system which allows for immediate and contemporaneous inoculation of a plurality of reagent pads forming part of a test substrate. The flow system includes a plurality of nozzles and a support structure which directs flow into the individual reagent pads while avoiding cross-contamination.

5 Claims, 3 Drawing Sheets

CAPILLARY FLOW APPARATUS FOR INOCULATION OF A TEST SUBSTRATE

BACKGROUND OF THE INVENTION

1. Field of the Invention

The present invention relates to an apparatus and method for distributing a fluid specimen onto a test substrate. More particularly, the present invention relates to a dispensing apparatus which employs capillary flow to inoculate a test substrate.

2. Description of Related Art

The art of analytical chemistry has been greatly advanced since biochemistry began emerging as a primary scientific frontier, requiring increasingly sophisticated analytical methods and tools to solve problems. Likewise, the medical profession has lent impetus to the growth of analytical chemistry, with its desiderata of both high precision and speed in obtaining results.

To satisfy the needs of the medical profession as well as other expanding technologies such as the brewing industry, chemical manufacturing, etc., a myriad of analytical procedures, compositions and apparatus have evolved, including the so-called "dip-and-read" type reagent test device. Reagent test devices enjoy wide use in many analytical applications, especially in the chemical analysis of biological fluids, because of their relatively low cost, ease of use, and speed in obtaining results. In medicine, for example, numerous physiological functions can be monitored merely by dipping a reagent strip test device into a sample of body fluid, such as urine or blood, and observing a detectable response, such as a change in color or a change in the amount of light reflected from or absorbed by the test device. Moreover, in light of the increased need for drug testing, reagent strip test devices suitable for inoculating urine chemistry test substrates have become increasing more in demand.

Often diagnostic chemical analysis involves the testing of a single liquid specimen for a multitude of different analytes. Consequently, test devices capable of detecting a multitude of analytes have become available on the market. Illustrative of such test devices currently in use are products available from the Diagnostics Division of Miles, Inc. under the trademarks CLINISTIX, MULTISTIX, KETOSTIX, N-MULTISTIX, DIASTIX, DEXTROSTIX, and others. Test devices such as these usually comprise one or more carrier matrices, such as absorbent paper, having incorporated therein a particular reagent or reactant system which manifests a detectable response, e.g., a color change, in the presence of a specific test sample component or constituent. Depending on the reactant system incorporated with a particular matrix, these test devices can detect the presence of glucose, ketone bodies, bilirubin, urobilinogen, occult blood, nitrite, and other substances. A specific change in the intensity of color observed within a specific time range after contacting the test device with a sample indicates the presence of a particular constituent and/or its concentration in the sample. Some of these devices and their reagent systems are set forth in U.S. Pat. Nos. 3,123,443; 3,212,855; 3,814,668; and 4,647,420. Thus, it is customary for reagent test devices to contain more than one reagent bearing carrier matrix, in which each reagent bearing carrier matrix is capable of detecting a particular constituent in a liquid sample. For example, a reagent test device could contain a reagent bearing carrier matrix responsive to glucose in urine and another matrix responsive to ketones, such as acetoacetate, which is spaced from, but adjacent to, the glucose responsive matrix. Such a product is marketed by the Diagnostics Division of Miles, Inc. under the trademark KETO-DIASTIX. Another reagent test device marketed by the Diagnostics Division of Miles, Inc., N-MULTISTIX, contains eight adjacent reagent incorporated matrices providing analytical measurement of pH, protein, glucose, ketones, bilrubin, occult blood, nitrite, and urobilinogen.

The traditional approach of dipping a reagent strip into a test tube or the like containing the fluid sample was adequate in some instance where there were just a few matrices or pads on the reagent strip. As the number of pads have increased up to as many as 8 to 12 per device to cope with the needs of users, the amount of sample required in a test tube and the size of the test tubes needed to make certain that all of the matrices present on a reagent strip are properly inoculated with test sample have been substantially increased. The need for larger test tubes and higher quantities of fluid sample represents a decrease in economic efficiency as well as an inefficient us of resources. The inefficiency in resources is especially apparent when one considers that in using the dipping approach the sample i contaminated by the first exposure to the first reagent strip. The sample is thus unavailable for further use and must be discarded.

The dipping approach also presents the problem of runover between reagent matrices in which the fluid runover transports chemicals from one matrix to another, resulting in contamination of the matrices and improper results Furthermore, the dipping technique is also a time consuming approach and a messy approach which requires careful blotting of the inoculated reagent test strip following each dippir.g.

In view of the problems associated with the dipping technique, other techniques have been relied upon. One such technique which the prior art has come to rely upon is the pipetting technique. Pipetting, however, requires a considerable amount of skill with respect to the amount of liquid which is applied to each matrix and the point of application. In addition, and very significantly, the pipetting technique is an extremely time consuming technique which is unsuitable for automatic analysis instruments requirement high throughput. For instance, an auto-urinalysis instrument requires a high throughput (e.g., a minimum of 300 samples/hour) which would mean that the user has about 12 seconds or less for inoculation and syringe cleaning. Pipetting, in itself, requires usually more than 1 second per reagent matrix or pad. Accordingly, pipetting is inappropriate for use with many reading instruments—especially when the reagent strip has a large number (e.g., 8–12) of matrix pads.

SUMMARY OF THE INVENTION

The present invention is directed at providing a solution to the aforementioned problems by providing a device which, among other things, is readily adapted to automated instrumentation permits precise inoculation of each reagent matrix area while not requiring the lab technician to master (or maintain) any skill or technique for inoculating the individual matrices with the appropriate amount. In fact, by utilizing the technique made available by the present invention, it is possible to inoculate an entire profile of matrices in about 2–3 seconds from one dispense without the above-discussed problems associated with the prior art. The benefits provided by the present invention has proven particularly applicable for inoculating urine chemistry strips.

The present invention is contemplated as a relatively inexpensive disposable inoculation device which includes a main body preferably formed of a clear or see-through material. The main body includes a capillary flow system having an access aperture formed in the surface of the main body. Extending from the access aperture is a first conduit, which slopes or extends vertically downward. A second conduit which preferably extends horizontally to one side or both sides of the first conduit is in communication with the first conduit. Extending vertically off of the second conduit are a plurality of nozzles, each having an inlet which is in communication with the horizontal conduit. The nozzles are arranged in series along the length of the horizontal conduit.

Forming a part of the main body is an access block which is secured to or integral with the block member making up the greater majority of the main body. The block member includes a front surface in which the capillary flow system is formed.

In a preferred embodiment, the nozzles, second conduit and a portion of the first conduit are formed in the front surface in a machining process such as end milling. The machining process involves the formation of a vertical depression within the front surface as well as grooves extending out to each side of the vertical depression. The nozzle are preferably fan shaped recesses which diverge outwardly away from the second conduit to an outlet.

The access block, which includes the access opening and a vertical passageway, is positioned such that the vertical passageway opens into the depression formed in the block member. In addition, a cover sheet is positioned over the machined portion of the capillary flow system. This positioning of the cover sheet creates an essentially air tight passageway having an inlet at the access aperture and an outlet coincident with the nozzle outlets. Accordingly, a fluid which is introduced into the access opening will flow by capillary action through the vertical passageway, depression, second conduit and nozzles.

The aforementioned machining process represents a preferred and efficient manner of forming the capillary flow system; however, various other methods of forming the capillary flow system are also contemplated such as, but not limited to, a molding procedure.

Positioned below the nozzle is a support structure which includes a support surface with a plurality of protuberances extending thereof. The protuberances are arranged in series along the support surface and each includes an upper, preferably planar, surface. The protuberances are arranged in series below a respective one of the series of nozzle openings. A clearance gap is provided between the support surface and the outlet of the nozzles.

A test substrate such as a reagent strip having a plurality of reagent pads is fitted within the clearance gap. Such a fitting can be achieved simply by friction contact between the protuberances and the bottom edge of the cover sheet and the area surrounding the outlet of each nozzle. Various other securement means are also possible such as adhesion or a clamping device.

In use, a fluid sample is inserted into the access aperture and, by way of capillary action, the fluid begins to spread through the capillary flow system. The fluid passes through the first conduit, through the second conduit and then eventually out through the plurality of nozzles arranged in series along the length of the second conduit. The side edge of a test substrate (such as a reagent strip) is positioned within the clearance gap such that the absorbent pads of the test substrate come in direct contact with the fluid exiting the nozzles. Preferably, the test substrate includes a number of different type reagent pads arranged in series and equal in number to the capillary nozzles. In this way, the different reagent pads can test for certain analytes and provide an immediate reading. Moreover, the use of individualized nozzles for each reagent pads avoids the problems of cross-contamination. Also, to further ensure against cross-contamination, the reagent pads can be separated along the supporting reagent strip or, alternatively, an impermeable barrier can separate the individual reagent pads positioned adjacent one another along the strip.

The protuberances and the indentations therebetween also assist in the prevention of cross-contamination. When fluid flows out of the nozzles it comes in contact with the absorbent pad or accumulates on the planar surface of the protuberances. Nonetheless, some fluid is likely not to be absorbed and will leak below both the nozzle opening and the planar surface into the indented area between the protuberances. In this area there can be found fluid from an adjacent nozzle which has passed over an adjacent protuberance. However, the indented area is well below the bottom edge of the different reagent pads and therefore cross-contamination is avoided.

The other features and advances will become apparent upon reference to the following Description of a Preferred Embodiment when read in light of the attached drawings.

DETAILED DESCRIPTION OF A PREFERRED EMBODIMENT

Figure 1:
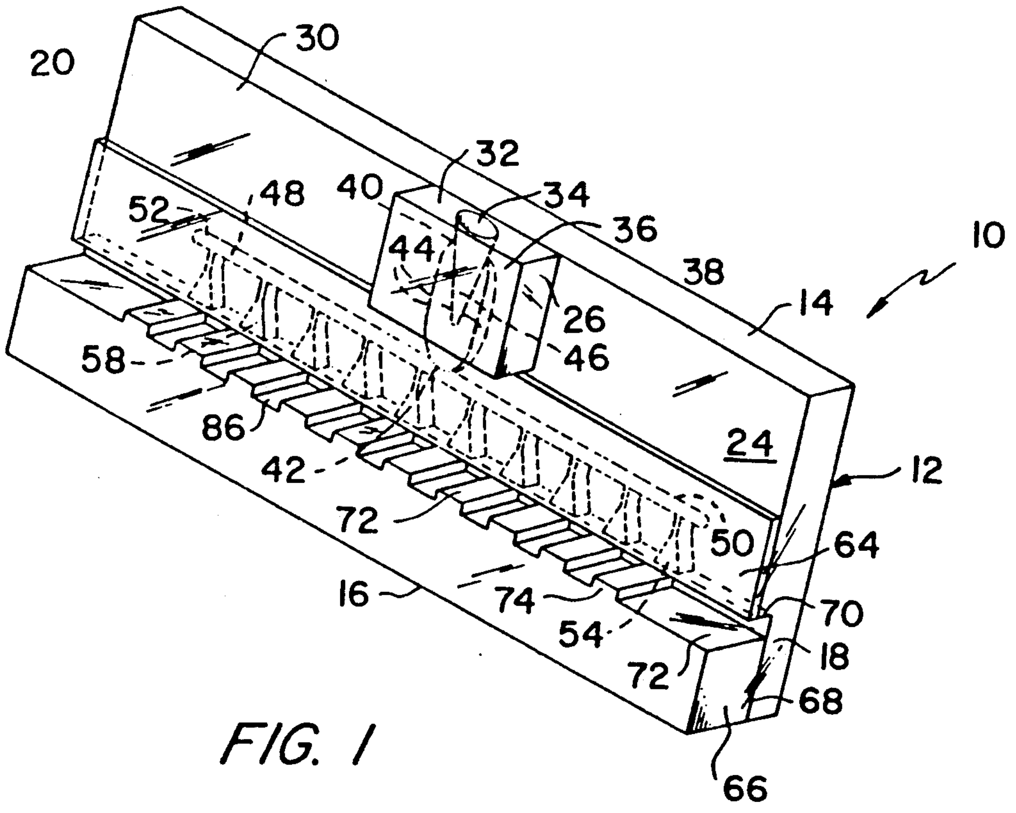
FIG. 1 is a perspective view of the invention.

FIG. 1 shows, in perspective, inoculation device 10 which is preferably a one use disposable device. Device 10 includes main body 12 which comprises block member 30 and access block 26. Block member 30 is illustrated in FIGS. 1-4 as being essentially rectangular with upper edge 14, bottom edge 16, and ends 18, 20. Various other shapes for block member 30 are also possible; although a rectangular shape has proven most suitable. Preferably, main body 12 is formed of a light weight and relatively inexpensive material such as plastic. Also, the material forming main body 12 is preferably a solid clear or translucent material. Plexiglass has proven suitable for the purposes of the invention. In a preferred embodiment of the invention, block member 30 is about 4 inches in length, 1.5 inches in height and 3/16 of an inch in thickness.

Access block 26 is attached to, or integral with, block member 30 and positioned so as to have upper surface 32 in common with upper edge 14 of block member 30. Access block 26 has formed in upper surface 32 access aperture 34 which provides an opening into which a fluid sample can be inserted. Extending down from access aperture 34 is passageway 36 shown to be conical in shape. The bottom portion of passageway 36 opens into depression 38 which has curved end surfaces and parallel side edges. Access block 26 is preferably formed of the same material as block member 30 although material variations between the two ar possible. A preferred size for access block is about 9/16 of an inch in horizontal length and 11/16 of an inch in vertical length. The thickness of access block 26 is preferably the same as that of block member 30 while access aperture 34 is also preferably about 3/16 of an inch in diameter thus necessitating a portion of access aperture being formed in block member 30.

Depression 38 is formed in front surface 24 of block member 30 and has a top edge 40 and a lower edge 42 separated by side edges 44. The top edge 40 is positioned just below upper edge 14 of block member 30 and below access block 26. Depression 38 extends out from the underneath of access block 26. In a preferred embodiment the vertical length of depression 38 is about 7/8 of an inch while the horizontal width is about 3/16 of an inch and the depth of depression 38 is about 0.03 of an inch. Depression 38 can be formed in a machining process such as end milling or any other suitable manner such as molding.

Vertical passageway 36 in combination with depression 38 forms first conduit 46. Extending off to each side of first conduit 46 is second conduit 48, which can have a length of about 3 inches and a width of about 0.2 inch. Second conduit 48 includes a first branch 50 and a second branch 52. Although access block 26 and first conduit 46 are shown to be centered with respect to second conduit 48, it is also contemplated that access block 26 and first conduit 46 be in different positions along the length of second conduit 48. For example, access block 26 and depression 38 could be formed at one end of second conduit 48 rather than in the mid-region. A central position as shown in FIG. 2 has prove to be the most suitable position however.

First and second branches 50, 52 of second conduit 48 represent grooves formed in front surface 24. Each branch extends out from depression 38 to a region close to a respective end of block member 30. In a preferred embodiment the grooves forming first and second branches 50, 52 are each about one and ⅜ inches in length, about 0.03 inch in depth and about 1/16 of an inch in width. A machining operation or a molding operation is contemplated as being the preferred manner for forming branches 50, 52 in front surface 24 of block 30.

Figure 2:
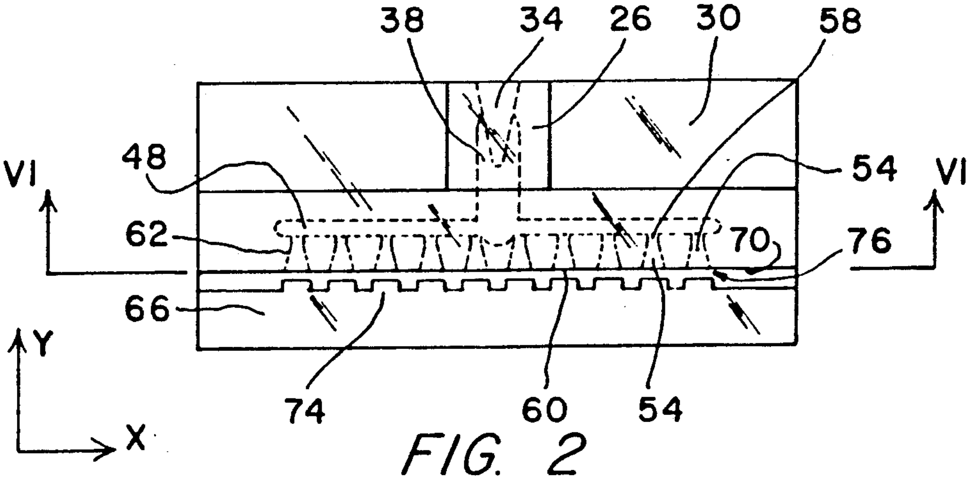
FIG. 2 is a front elevational view of the invention.

As shown best in FIGS. 1 and 2 a plurality of fan-shaped nozzles 54 are arranged in series along the length of branches 50, 52. Each nozzle includes an inlet 58 which opens into second conduit 48. Said inlet 58 has an opening which can be about 0.015 inch in depth and about 0.3 inch in width. Nozzles 54 diverge outwardly away from inlet 58 and include outlets 60 (FIGS. 2 and 6).

Figure 6:
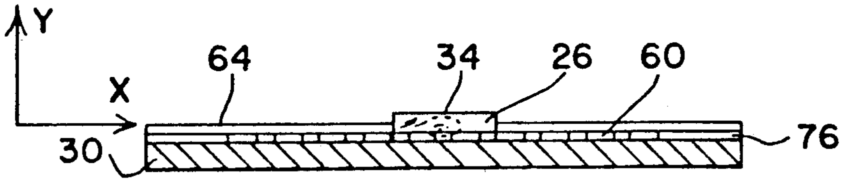
FIG. 6 is a cross-sectional view of FIG. 2 along line VI—VI
Figure 4:
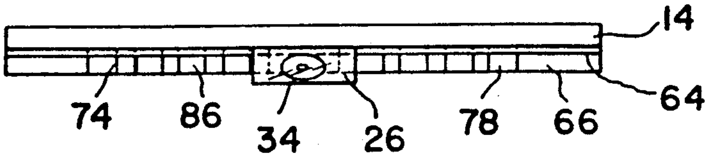
FIG. 4 is a plan view of the invention.

As shown in FIG. 6 outlets 60 are relatively long in horizontal (X-axis) length and shallow in depth to assist in capillary action. In a preferred embodiment nozzles 54 are about ¼ of an inch in the vertical length (Y-axis). Also, inlets 58 are essentially cylindrical with a diameter of about 0.015 of an inch while exterior sides 62 of nozzles 54 diverge outwardly at an angle of about 30°–55° and more preferably about 45°. Nozzle outlet 60 is preferably about 3/16 of an inch in horizontal length and also about 0.015 inch in depth (i.e., into the interior of block member 30). FIG. 6 illustrates a cross-sectional view of block member 30 along lines VI—VI. As can be seen outlet openings 60 are arranged in series and spaced from one another along the length of body member 30.

Referring again to FIG. 1, there is shown cover sheet 64 formed preferably of the same material as block member 30. Cover sheet 64 is secured in position over each of nozzles 54, second conduit 48 and the portion of first conduit 46 extending out away from access block 26. Cover sheet 64 thus acts to essentially seal off the entire capillary flow system with the exception of aperture 34 and outlets 60. If an alternate method of manufacturing is relied upon (e.g. molding) then cover sheet 64 might not be required. However, in relying on a machining process performed on front surface 24 of block member 30, cover sheet 64 provides an economical solution to providing the necessary sealing function.

Cover sheet 64 is preferably secured to front surface 24 by way of a solvent which fuses cover sheet 64 directly to front surface 24. In utilizing this method of fixation there is assurance that leakage of fluid will not take place between cover sheet 64 and front surface 24. Various other means of fixation are also possible including epoxy adhesion or mechanical fasteners (e.g. screws, rivets, clamps, etc.). To save on material costs, cover sheet 64 is preferably formed so as to be about 1/32 of an inch in thickness.

The number of nozzles formed in the device depends on contemplated use and the type of test substrate being relied upon. A preferred number of nozzles is about 8–12 and more preferably about 10 as shown in FIGS. 1 and 2. With this arrangement an entire profile of reagent pads such as the 10 reagent pads positioned on the aforementioned MULTISTIX TM product.

Figure 3A:
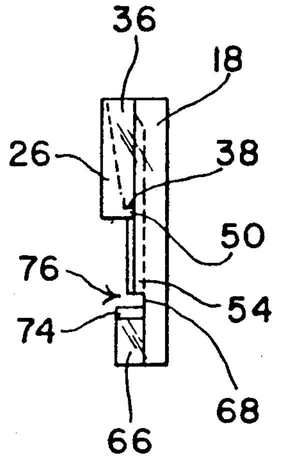
FIG. 3 is an end view of the invention.
FIG. 3B is an enlarged cut-away of a portion of FIG. 3.
Figure 3B:
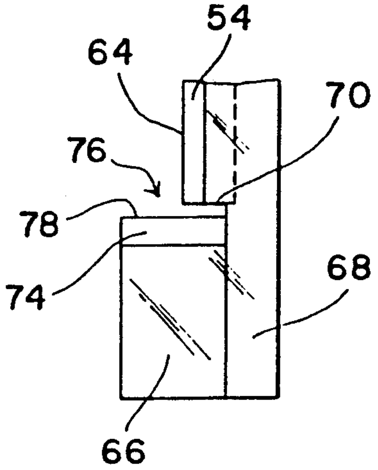

As shown in FIGS. 1 and 3, block member 30 includes recessed portion 68 with recessed shoulder 70. Shoulder 70 is of a depth which is preferably about equal to the sum of the depth of nozzle outlets 60 (FIG. 6) and the thickness of cover sheet 64. Secured to recessed portion 68 is test substrate support 66 which is preferably of the same material and about the same thickness as block member 30. Test substrate 66 includes upper support surface 72. Extending upwardly off of support surface 72 are a plurality of protuberances 74. A free space 76 (FIGS. 3 and 3B) is provided between the upper, essentially planar, surface 78 of protuberances 74 and the edge defined by recessed shoulder 70.

FIG. 3B shows an enlargement in the area of recessed shoulder 70. Free space 76 is defined, in part, by planar surface 78 and stepped shoulder 70 which are shown to be separated by a distance "L". A preferred value for distance "L" is about 0.03 to 0.05 of an inch and more preferably about 0.04 of an inch.

Figure 5A:
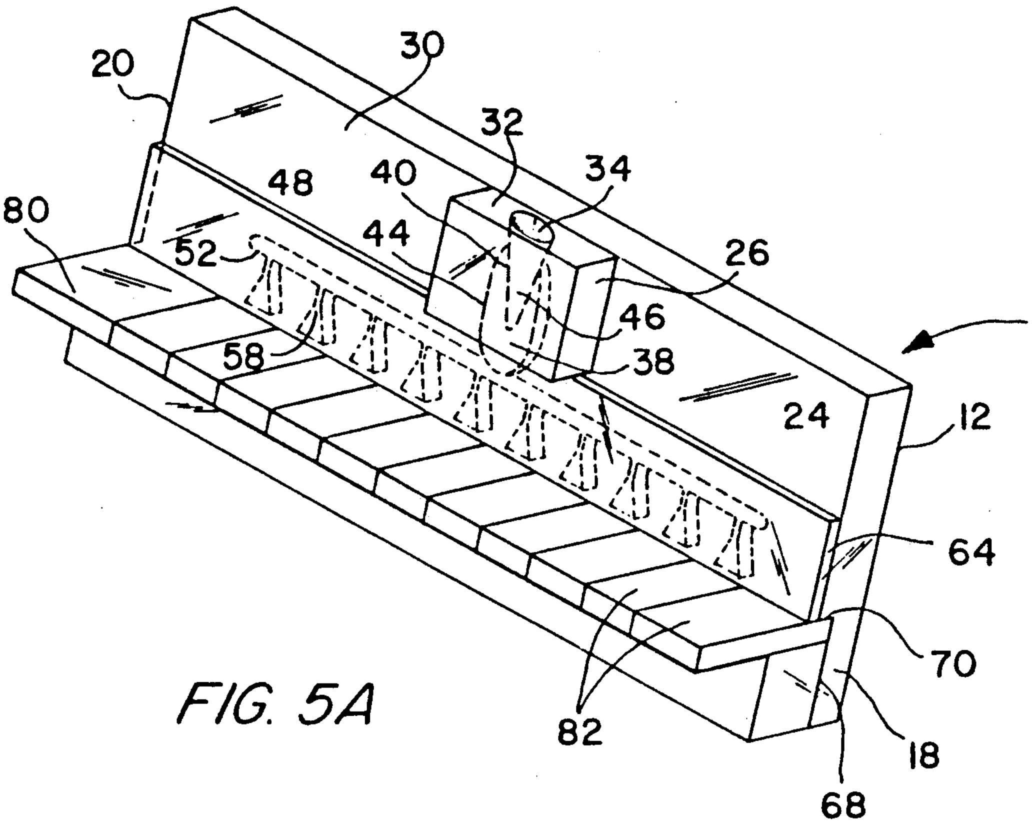
FIG. 5A is an end view of that shown in FIG. 5.
Figure 5B:
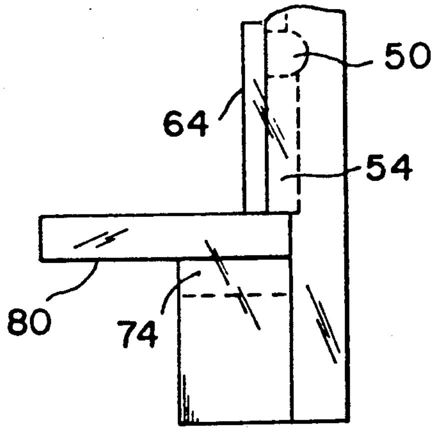
FIG. 5 is a perspective view as in FIG. 1 with a test substrate in place.

FIG. 5 shows device 10 with test substrate 80 in position for inoculation. Test substrate 80 is preferably a reagent strip having a plurality of reagent pads such as the MULTISTIX (TM) test substrate previously mentioned. Reagent pads 82 include an absorbent layer impregnated with chemicals capable of creating a color change or other detectable change upon contact with a certain analyte. Test substrate 80 has a thickness which allows for substrate 80 to be friction fitted between the bottom of stepped shoulder 70 and planar surfaces 78 of each of protuberances 74. Such a friction fit ensures good surface contact between pads 82 and the capillary outlets of nozzles 54. This arrangement is shown in greater detail in FIG. 5A.

In use, the side edge of a test substrate is inserted into the recess below each nozzle and protuberances 74 act to maintain close contact between the upper surface of reagent pads 82 and the fluid outlets of nozzles 54. A fluid sample, such as a urine sample, is then inserted into access aperture 34 whereupon the fluid is drawn through first and second conduits (46, 48) as well as nozzles 54 and into a respective reagent pad positioned below.

As the fluid is drawn into each reagent pad 82, a color change or other manner of detection will indicate when a predetermined analyte is present. A user can thus make a determination either visually or by automation and then discard the preferably disposable device. If, however, it would be more efficient to reuse the invention due to the availability of an efficient, automated system of cleaning, then the present invention may be reused.

Further modifications and variations of the invention will be apparent from the foregoing and are intended to be encompassed by the claims appended hereto.

What is claimed is:

1. Apparatus for the simultaneous inoculation of multiple test means with liquid, said apparatus comprising:

a main body having a block member with a single liquid inlet located in the top of said block member and a capillary flow system interconnecting said single liquid inlet with multiple nozzle outlets positioned at the bottom of said block member, wherein the capillary flow system consists of means defining a common capillary flow conduit for the flow of liquid from said single liquid inlet into multiple capillary tubes and wherein each of said multiple capillary tubes is connected to a respective nozzle outlet;

support means positioned below said multiple nozzle outlets for holding multiple test means which are to be inoculated with liquid introduced into said single liquid inlet; and a plurality of protuberances positioned in series along the length of said support means, said protuberances being aligned such that there is a protuberance directly below each nozzle outlet.

2. The apparatus of claim 1, wherein said nozzle outlets are fan-shaped, each having an inlet narrower than an outlet thereof.

3. The apparatus of claim 1, wherein there are about 8 to 12 nozzle outlets.

4. The apparatus of claim 1, wherein each of said protuberances has an essentially planar upper surface.

5. The apparatus of claim 4, wherein said protuberances extend upwardly from said support surface for about 0.03 inch.

* * * * *